(12) United States Patent
Odinak et al.

(10) Patent No.: US 7,801,731 B2
(45) Date of Patent: *Sep. 21, 2010

(54) SYSTEMS AND METHODS FOR PROCESSING VOICE INSTRUCTIONS IN A VEHICLE

(75) Inventors: Gilad Odinak, Bellevue, WA (US); Hakan Kostepen, Escondido, CA (US); Oren Danieli, San Diego, CA (US)

(73) Assignee: Intellisist, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/929,656

(22) Filed: Oct. 30, 2007

(65) Prior Publication Data

US 2008/0147401 A1    Jun. 19, 2008

Related U.S. Application Data

(63) Continuation of application No. 10/076,874, filed on Feb. 14, 2002, now Pat. No. 7,406,421.

(60) Provisional application No. 60/332,025, filed on Nov. 21, 2001.

(51) Int. Cl.
*G10L 11/00* (2006.01)
*G10L 15/00* (2006.01)
*G06F 7/00* (2006.01)

(52) U.S. Cl. .................. 704/275; 704/246; 704/251; 701/36

(58) Field of Classification Search ............. 704/275, 704/251, 246; 701/211, 36; 74/275, 251

See application file for complete search history.

(56) References Cited

U.S. PATENT DOCUMENTS 4,827,500 A    5/1989    Binkerd et al.

(Continued)

FOREIGN PATENT DOCUMENTS

EP    0899704 A    3/1999

(Continued)

OTHER PUBLICATIONS

Burnett, "Usable Vehicle Navigation Systems: Are We There Yet?", Paper presented at Vehicle Electronic Systems 2000—European conference and exhibition, ERA Technology Ltd, Jun. 29-30, 2000, pp. 3.1.1-3.1.11.*

(Continued)

*Primary Examiner*—David R Hudspeth
*Assistant Examiner*—Abdelali Serrou
(74) *Attorney, Agent, or Firm*—Black Lowe & Graham PLLC; Richard T. Black; P. G. Scott Born

(57) ABSTRACT

A system and method for reviewing inputted voice instructions in a vehicle-based telematics control unit. The system includes a microphone, a speech recognition processor, and an output device. The microphone receives voice instructions from a user. Coupled to the microphone is the speech recognition processor that generates a voice signal by performing speech recognition processing of the received voice instructions. The output device outputs the generated voice signal to the user. The system also includes a user interface for allowing the user to approve the outputted voice signal, and a communication component for wirelessly sending the generated voice signal to a server over a wireless network upon approval by the user.

14 Claims, 5 Drawing Sheets

U.S. PATENT DOCUMENTS

| | | | |
|---|---|---|---|
| 4,876,710 A | 10/1989 | Reed et al. |
| 5,029,233 A | 7/1991 | Metroka |
| 5,062,132 A | 10/1991 | Yasuda et al. |
| 5,259,018 A | 11/1993 | Grimmett et al. |
| 5,371,901 A | 12/1994 | Reed et al. |
| 5,414,624 A | 5/1995 | Anthonyson |
| 5,539,810 A | 7/1996 | Kennedy, III et al. |
| 5,566,229 A | 10/1996 | Hou et al. |
| 5,712,788 A | 1/1998 | Liaw et al. |
| 5,719,921 A | 2/1998 | Vysotsky |
| 5,732,074 A | 3/1998 | Spaur et al. |
| 5,835,881 A | 11/1998 | Trovato et al. |
| 5,867,780 A | 2/1999 | Malackowski et al. |
| 5,870,667 A | 2/1999 | Globuschutz |
| 5,940,481 A | 8/1999 | Zeitman |
| 5,945,985 A | 8/1999 | Babin et al. |
| 5,956,683 A | 9/1999 | Jacobs et al. |
| 5,963,861 A | 10/1999 | Hanson |
| 6,009,374 A | 12/1999 | Urahashi |
| 6,037,880 A | 3/2000 | Manion |
| 6,052,604 A | 4/2000 | Bishop et al. |
| 6,085,428 A | 7/2000 | Casby et al. |
| 6,111,539 A * | 8/2000 | Mannings et al. ...... 342/357.09 |
| 6,111,964 A | 8/2000 | Ishibashi |
| 6,125,284 A | 9/2000 | Moore et al. |
| 6,128,482 A | 10/2000 | Nixon et al. |
| 6,154,662 A | 11/2000 | Norton et al. |
| 6,169,515 B1 | 1/2001 | Mannings et al. |
| 6,199,013 B1 | 3/2001 | O'Shea |
| 6,206,283 B1 | 3/2001 | Bamsal et al. |
| 6,212,473 B1 * | 4/2001 | Stefan et al. ................. 701/210 |
| 6,233,452 B1 | 5/2001 | Nishino |
| 6,240,347 B1 | 5/2001 | Everhart et al. |
| 6,317,684 B1 | 11/2001 | Roeseler et al. |
| 6,334,089 B2 | 12/2001 | Hessing |
| 6,349,329 B1 | 2/2002 | Mackintosh et al. |
| 6,351,698 B1 * | 2/2002 | Kubota et al. ................. 701/51 |
| 6,370,237 B1 | 4/2002 | Schier |
| 6,370,506 B1 | 4/2002 | Ahluwalia |
| 6,374,214 B1 | 4/2002 | Friedland et al. |
| 6,405,027 B1 | 6/2002 | Bell |
| 6,421,607 B1 | 7/2002 | Gee et al. |
| 6,441,790 B1 | 8/2002 | Forrester et al. |
| 6,487,402 B1 | 11/2002 | Faus et al. |
| 6,487,494 B2 | 11/2002 | Odinak et al. |
| 6,516,466 B1 | 2/2003 | Jackson |
| 6,526,486 B2 | 2/2003 | Theimer |
| 6,615,381 B1 | 9/2003 | Nohara et al. |
| 6,671,617 B2 | 12/2003 | Odinak et al. |
| 6,697,638 B1 | 2/2004 | Larsson et al. |
| 6,765,497 B2 | 7/2004 | Ablay et al. |
| 6,810,323 B1 | 10/2004 | Bullock et al. |
| 6,868,385 B1 | 3/2005 | Gerson |
| 6,909,947 B2 | 6/2005 | Douros et al. |
| 6,964,023 B2 | 11/2005 | Maes et al. |
| 7,084,859 B1 | 8/2006 | Pryor |
| 7,177,738 B2 | 2/2007 | Diaz |
| 7,392,191 B2 | 6/2008 | Odinak et al. |
| 7,472,075 B2 | 12/2008 | Odinak et al. |
| 2001/0014863 A1 | 8/2001 | Williams, III |
| 2001/0016500 A1 | 8/2001 | Son et al. |
| 2001/0021646 A1 | 9/2001 | Antonucci et al. |
| 2001/0033643 A1 | 10/2001 | Mulvey et al. |
| 2002/0065037 A1 | 5/2002 | Messina et al. |
| 2002/0069071 A1 * | 6/2002 | Knockeart et al. .......... 704/275 |
| 2002/0075168 A1 | 6/2002 | Ablay et al. |
| 2002/0103639 A1 | 8/2002 | Chang et al. |
| 2002/0140545 A1 | 10/2002 | Nietupski et al. |
| 2002/0143645 A1 * | 10/2002 | Odinak et al. ................. 705/26 |
| 2002/0143999 A1 | 10/2002 | Yamagami |
| 2004/0110515 A1 | 6/2004 | Blumberg et al. |

FOREIGN PATENT DOCUMENTS

| | | |
|---|---|---|
| EP | 0911783 A | 4/1999 |
| FR | 2762906 | 11/1998 |
| WO | WO9909374 | 2/1999 |

OTHER PUBLICATIONS

Nusser, et al. "Bluetooth-based Wireless Connectivity in an Automotive Environment." Vehicular Technology Conference, IEEE-VTS Fall VTC 200, 52nd. vol. 6, Sep. 24-28, 2000, Boston, MA. pp. 1935-1942.

Yilin Zhao. "Efficient and reliable data transmission for cellular-and-GPS-based mayday systems, Intelligent Transportation System," ITSC'97. IEEE Conference, Nov. 9-12, 1997, Boston MA. pp. 555-559.

Stirling, A. "Mobile multimedia platforms." Vehicular Technology Conference. IEEE-VTS Fall VTC 200, 52nd. vol. 6, Sep. 24-28, 2000, Boston, MA. pp. 2541-2548.

Jameel et al. "Interest Multimedia on Wheels: Connecting Cars to Cyberspace." Intelligent Transportation System, ITSC'97. IEEE Conference, Nov. 9-12, 1997, Boston MA. pp. 637-642.

Kushner et al. Effects of subtractive-type speech enhancement/noise reduction algorithms on parameter estimation for improved recognition and coding in high noise environments, vol. 1, ICASSP-89, May 23-26, 1989, pp. 211-221.

Boll, Steven F. Supression of acoustic noise in speech using spectral subtracttion, IEEE Transaction of ASSP, vol. ASSP-2 No. 2, Apr. 2, 1979.

Un and Choi. Improving LPC analysis of noisy speech by autocorrelation subtraction method. ICASSP 81 Proceedings, Mar. 30-Apr. 1, 1981, pp. 1082-1085.

* cited by examiner

SYSTEMS AND METHODS FOR PROCESSING VOICE INSTRUCTIONS IN A VEHICLE

PRIORITY CLAIM

This application is a continuation of U.S. application Ser. No. 10/076,874 filed Feb. 14, 2002 now U.S. Pat. No. 7,406,421 which claims priority from U.S. Provisional Patent Application Ser. No. 60/332,025 filed Nov. 21, 2001.

FIELD OF THE INVENTION

This invention relates generally to the field of vehicle user interfaces.

BACKGROUND OF THE INVENTION

The following application is incorporated by reference as if fully set forth herein: U.S. application Ser. No. 10/076,874 filed Feb. 14, 2002.

Various vehicle devices exist that are designed to provide a vehicle operator with travel-related information. For example, a display coupled to a global positioning system (GPS) may be used to present to the vehicle operator a detailed map showing the vehicle location, a desired destination, and the geographic details of the surrounding area. Under certain situations, the vehicle operator has the opportunity to study the map in exact and thorough detail. An example is a parked vehicle. There are other times, however, when the vehicle operator is too busy operating the vehicle to safely view the displayed information, let alone study the displayed information in exacting detail. This is particularly the case where the vehicle operator is in the midst of a particularly taxing circumstance, for example, driving in heavy traffic, driving at a high speed, or otherwise distracted by an emergency situation or telephone conversation. In such situations, the display presentation distracts the vehicle operator because the operator focuses attention on the details shown on the display.

Therefore, there exists a need to provide valuable and timely travel-related information to a vehicle operator while minimizing potentially dangerous distractions to the vehicle operator.

SUMMARY OF THE INVENTION

The present invention is a system and method for reviewing inputted voice instructions in a vehicle-based telematics control unit. The system includes a microphone, a speech recognition processor, and an output device. The microphone receives voice instructions from a user. Coupled to the microphone is the speech recognition processor that generates a voice signal by performing speech recognition processing of the received voice instructions. The output device outputs the generated voice signal to the user. The system also includes a user interface for allowing the user to approve the outputted voice signal, and a communication component for wirelessly sending the generated voice signal to a server over a wireless network upon approval by the user.

In accordance with further aspects of the invention, a first component generates a digest including the generated voice signal, and a second component sends the digest to a human operator system.

In accordance with other aspects of the invention, a text generator generates text from the generated voice signal, and the output device includes a display that presents the generated text.

In accordance with still further aspects of the invention, a voice synthesizer generates speech based on the generated voice signal, and the output device includes at least one speaker for presenting the generated voice.

As will be readily appreciated from the foregoing summary, the invention provides a feedback system for ensuring accuracy when providing voice instructions.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a system, method, and computer program product for modulating output over output devices (e.g., display, speakers) based on present vehicle conditions (e.g., speed, rate of change in speed or direction, emergencies). When the system determines that the vehicle requires a more attentive operator, the method of the present invention manipulates the format of information and content presented to the vehicle operator via the output devices.

Figure 1:
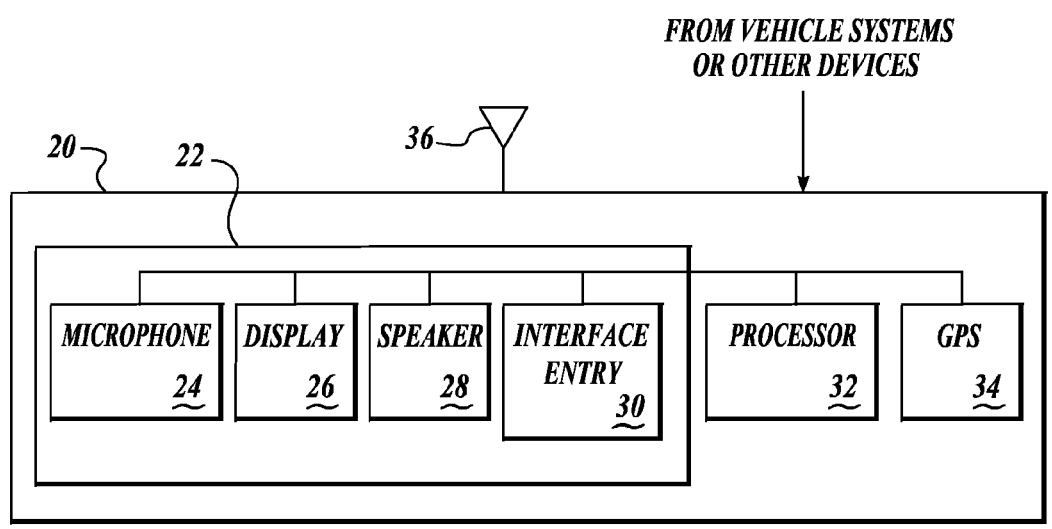
FIG. 1 is a block diagram illustrating the components of the present invention.

FIG. 1 shows a system 20, a telematics control unit, within a vehicle that performs the present invention. System 20 includes a user interface 22 having a microphone 24 for capturing the user's voice; a display 26; speakers 28; and an interface entry 30 for allowing the user to perform various interactive functions. System 20 also includes a processor 32; a global positioning system (GPS) 34 for determining precise vehicle locations; and a communications device 36, such as a cellular modem, for transmitting and receiving wireless information. System 20 is also coupled to receive information from other vehicle systems (not shown), such as a speedometer, an engine, or a braking system.

Figure 2:
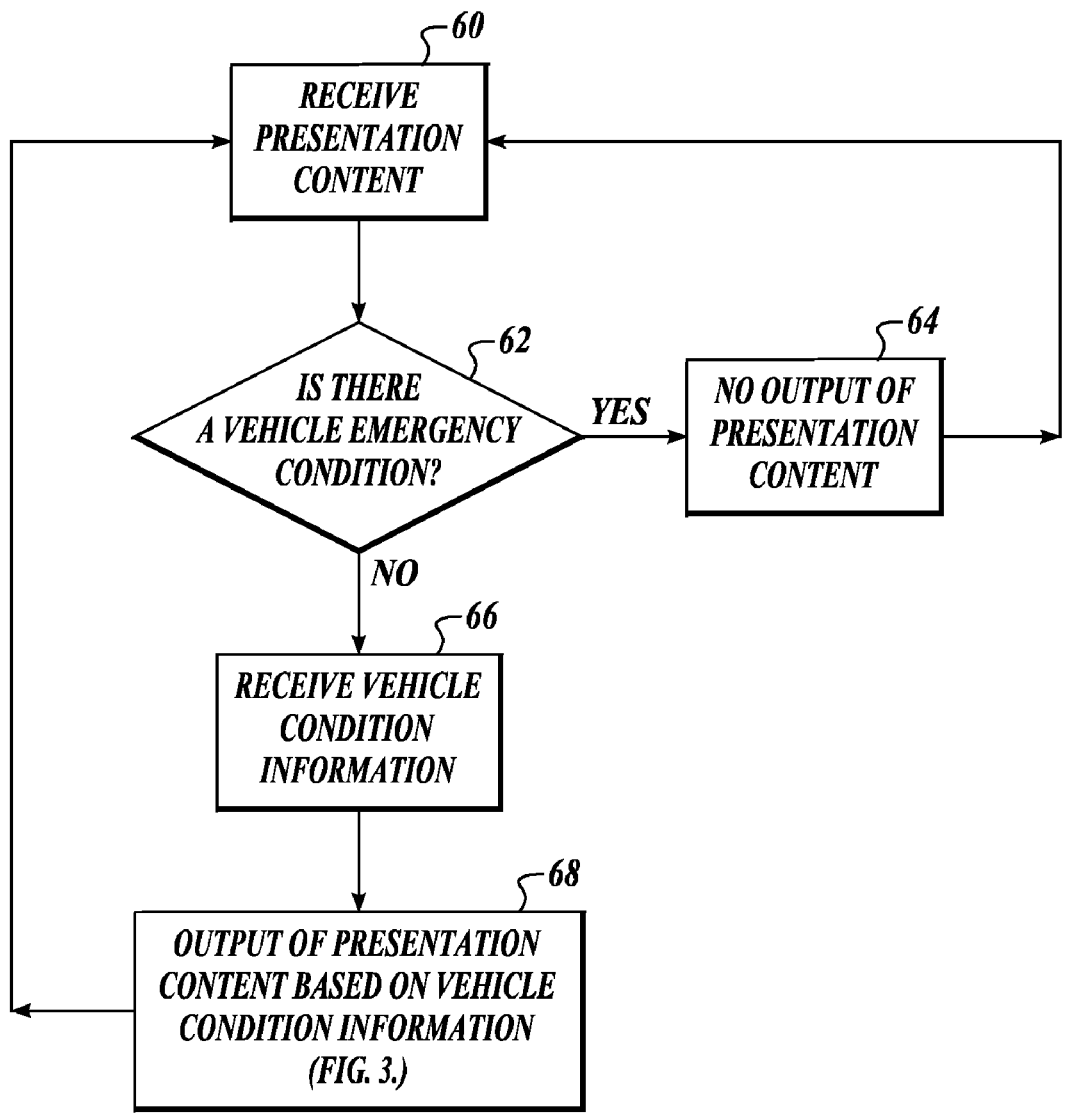
FIG. 2 is a flow chart illustrating the present invention performed by the device shown in FIG. 1.

FIG. 2 illustrates a preferred process performed by system 20. At block 60, system 20 and, more specifically, processor 32, receives presentation content. The presentation content is preferably received at communications device 36 from a server transmitted over a network (not shown). At decision block 62, processor 32 determines if any vehicle emergency condition exists based on information received from the other vehicle systems. If processor 32 determines that a vehicle emergency condition exists, processor 32 stops all output of received presentation content to any one of the components of user interface 22 (block 64). Examples of a vehicle emergency condition that may cause the processor to stop output presentation content to user interface 22 are signals received from the engine that indicate engine overheating or a signal that indicates the operator has applied brakes to the point where an anti-braking system is activated.

Figure 3:
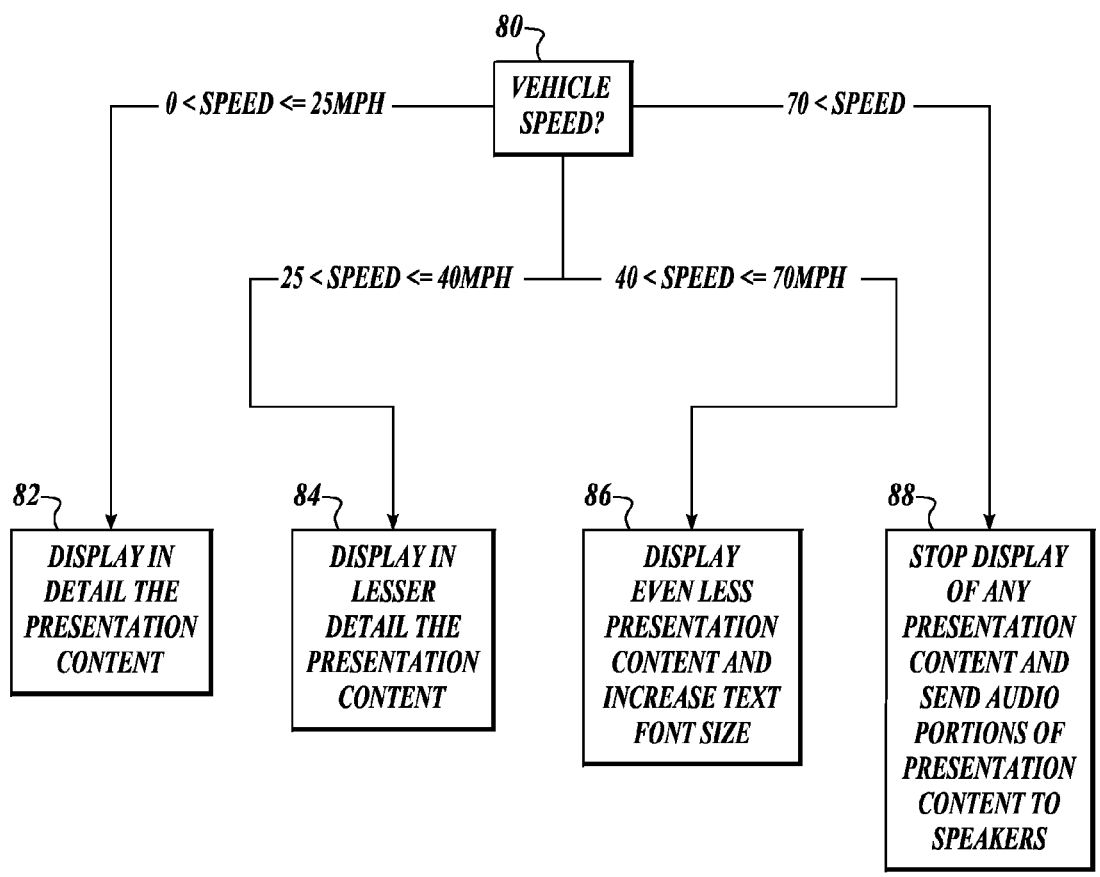
FIG. 3 is a flow chart illustrating the operation of a specific example of the present invention.

If, at decision block 62, processor 32 determines that there is not a vehicle emergency condition, processor 32 receives vehicle condition information (block 66). The vehicle condition information comes from a number of sources that generate signals, such as GPS 34 or a speedometer. At block 68, processor 32 outputs presentation content through user interface 22 based on the vehicle condition information. This step involves determining the substance and format of the presentation content to display on display 26 or broadcast on speakers 28 of user interface 22. For example, when the vehicle is parked, processor 32 presents all or nearly all of the received presentation content. As the vehicle condition changes, for example, the vehicle picks up speed, processor 32 changes the presentation content information that is shown on display 26. The change in presentation content may also involve shifting presentation of information from visual display to audio broadcast as output through speakers 28. In one example, the presented content is a full detailed map of the vehicle's location that includes directions to a previously requested destination. Based on the vehicle speed, or the rate of change in vehicle speed or direction, the detail shown on the map will be altered. As the vehicle speed increases, the detail shown on the map is reduced, for example, to include only the vehicle's present location in relation to nearby streets or intersections. Some or all of the presentation content, or map directions, may be translated to audio format and broadcast to the vehicle operator via speakers 28. In other examples, change in vehicle condition may result in alteration of the font or size of text, icons and graphics presented on the display, as well as increased or decreased audio broadcast. FIG. 3 illustrates an example, based on vehicle speed, of how processor 32 changes the output that is presented over user interface 22.

After blocks 64 and 68, processor 32 returns to block 60 to continue receiving more presentation content. In this embodiment, presentation content is processed in real-time from the time of reception from the server over the network to the output of presentation content to a vehicle operator through user interface 22. In an alternate embodiment, the presentation content can be received all at one time and stored by processor 32 before any determination is made of how to present the output. In another alternate embodiment, if a person other than the vehicle operator wishes to view the presentation content, presented output is set to whatever level of detail is desired.

FIG. 3 illustrates an example of the process performed at block 68 of FIG. 2. At block 80, vehicle speed information is determined, for example by reference to the vehicle speedometer. If the vehicle's speed is less than or equal to 25 mph, processor 32 generates a detailed display to present on display 26 of user interface 22 (block 82). As the speed of the vehicle increases, the amount of detailed visual information generated for display is reduced. Thus, if the vehicle speed is greater than 25 mph but less than or equal to 40 mph, processor 32 generates a display with less visual information than was generated for vehicle speeds of less than or equal to 25 mph (block 84). When the speed is greater than 40 mph but less than or equal to 70 mph, processor 32 reduces not only the amount of detail to be displayed on display 26, but also increases the font size of any text included in the displayed presentation content and changes the color to make it easier for an operator to view (block 86). When the speed is greater than 70 mph, processor 32 stops generating display information for presentation on display 26 and switches to a pure audio presentation for output over the speakers 28 (block 88). The specific speed ranges described are exemplary only. The exact trigger speeds may vary according to various factors, such as road conditions, vehicle specification, vehicle operator skill, etc., as well as user preference. Likewise, the output format of the presentation content may be varied according to user interface hardware or software constraints as well as user preference.

In addition to the example described above with reference to overall vehicle speed, presentation content can be automatically adjusted based upon one or more vehicle conditions related to rate of change in vehicle speed, rate of change in vehicle direction, cellular phone or headphone activation, radar detector activation, noise level decibels above a certain value, radio/CD player in use, TV/DVD console in use, turn signal, etc. The vehicle conditions are determined by vehicle systems, such as the vehicle speedometer, steering, engine, and braking and acceleration systems. Vehicle systems may also include additional components, such as temperature, humidity, wind speed and precipitation gauges, a compass, clock, etc. These additional vehicle system components may be integrated with or separate from system 20, so long as they are capable of being monitored by system 20. The method of the present invention automatically adjusts the output of presentation content based upon a monitor of these vehicle conditions, or a combination of these vehicle conditions. For example, system 20 monitors vehicle braking and acceleration systems with reference to an internal clock to determine the rate of change of vehicle speed. If vehicle speed is increasing or decreasing rapidly, system 20 automatically reduces the amount of detail provided in visual presentation content, and may transfer some or all of the content to audio presentation. In another example, system 20 monitors movement of the steering wheel and vehicle direction with reference to a compass and a clock to determine rate of change of vehicle direction. If vehicle direction is changing rapidly, system 20 would again automatically reduce the amount of detail provided in visual presentation content, as well as transfer some or all of the content to audio presentation.

Figure 4:
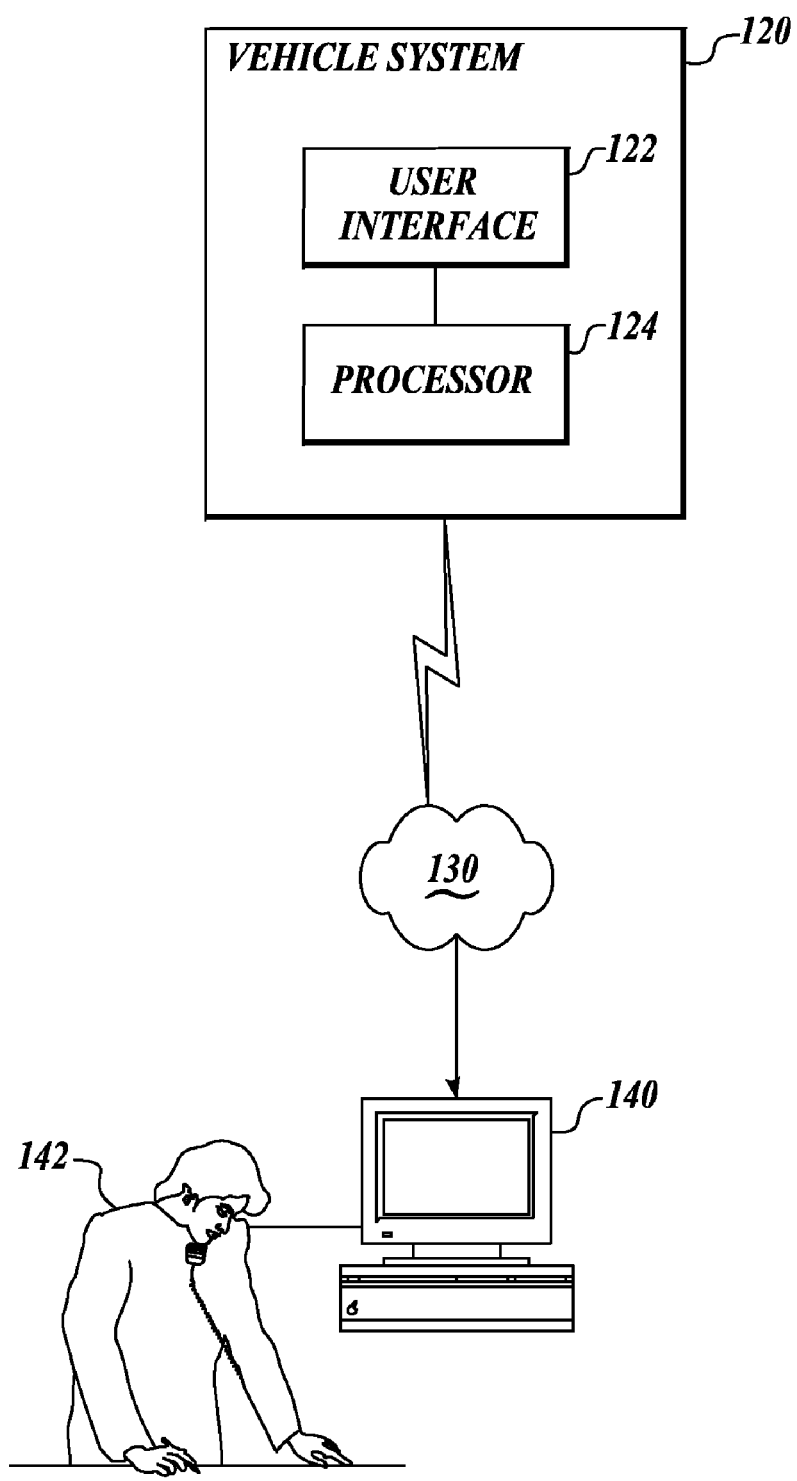
FIG. 4 is a block diagram illustrating the components of an alternate embodiment of the present invention.

FIG. 4 illustrates a vehicle system 120, a telematics control unit, that performs an alternate embodiment of the present invention. Vehicle system 120 includes a user interface 122 and a processor 124. User interface 122 includes a microphone that receives voice instructions from a user and sends them to processor 124. Processor 124 performs speech recognition processing of the received voice signals. The processor outputs the processed voice signals over speakers or a display that are part of user interface 122. Also, processor 124 sends the processed voice signals to an operator 142 at an operator system 140 over a wireless network 130.

Figure 5:
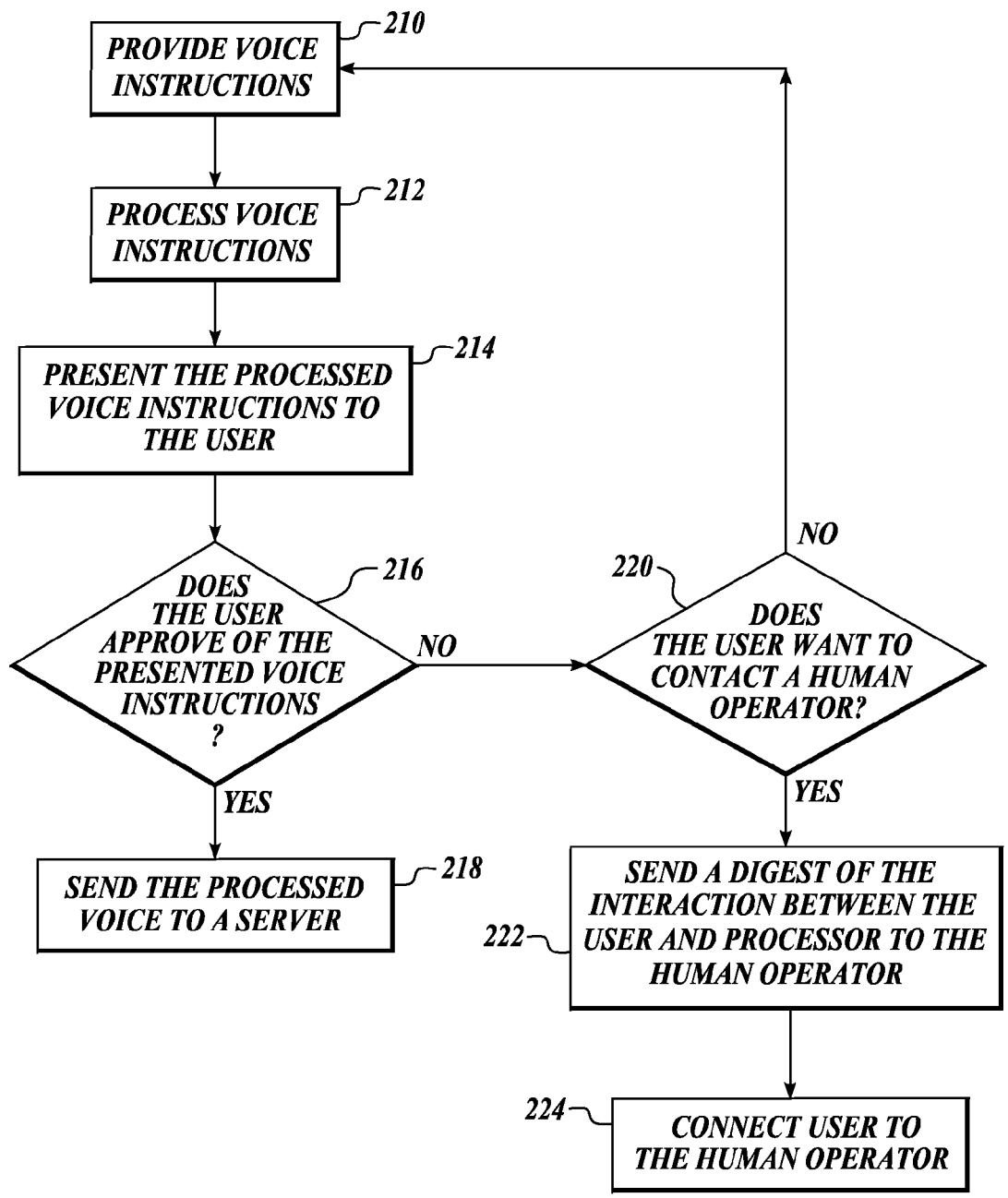
FIG. 5 is a flow chart illustrating the present invention performed by the device shown in FIG. 4.

FIG. 5 illustrates a process performed by system 120 shown in FIG. 4. First, at block 210, the user inputs voice instructions to system 120 (processor 124) via user interface 122. Next, at block 212, processor 124 performs speech recognition processing on the received voice instructions to determine the content of the inputted instructions. The result of the speech recognition processing is presented to the user via user interface 122 in the form of voice over speakers or text on a display (block 214). If processor 124 has interpreted the inputted voice instructions properly, as shown in decision block 216, the user instructs system 120 to send the processed instructions to a predefined destination (block 218). The predefined destination is preferably a system server. Otherwise, the user has the opportunity to contact a human operator to make sure the instructions are properly entered (decision block 220). If the user decides to contact the human operator, a digest of the interaction between the user and processor 124 is sent to human operator system 140 (block 222). Then, at block 224, the user is connected to the human operator who is tending a phone and/or computer terminal. At this point the user and human operator resolve the content of the user-initiated instructions. If at the decision block 220 the user does not approve of the presented voice instructions or desire to be connected to a human operator, the user can return to providing new voice instructions (block 210).

In an alternate embodiment, processor 124 processes a received voice instruction based on previously recorded prior processing of the same voice instruction. For example, at five previous episodes, the user provided a certain voice instruction about a restaurant. Processor 124 made a first determination as to what the user requested for each of the five episodes. In the first four of the five episodes, the user desired directions to the restaurant. In the fifth episode, the user desired stock information about the publicly traded company by the same name that owns the restaurant. The approved results (four directions; one stock information) of the processed voice instruction are recorded at processor 124 with the voice instruction for each episode. The next time the user provides that same voice instruction, processor 124 uses the previously recorded approved results when processing the voice instruction. Various methods of using the previously recorded approved results can be performed. In a first method, the most frequent recorded result becomes the result of the newly provided specific voice instruction. So, using the example above, directions are provided to the user, because the recorded results show requests for directions to the restaurant (as opposed to requests for stock information) occurring more frequently. In a second method, the most recent recorded result becomes the result of the newly provided specific voice instruction. So, using the example above, stock information is provided to the user, because the last recorded result was stock information.

With respect to the first four episodes described above, processor 124 processed the voice instruction as either a request for directions or as a request for something other than directions. If the voice instruction was processed as a request for directions, the user approves of the processing, and the resulting request for directions to the restaurant is recorded with the voice instruction for the episode. If the voice instruction was processed as a request for something other than directions, the user makes a request that processor 124 provide directions, thereby indicating that the processing of the voice instructions was incorrect. The user can indicate that the processing was incorrect (and in this example that directions were desired) in a number of different ways. One way to make a change request is to contact a human operator (decision block 220 of FIG. 5). The human operator makes the change for that episode, and the change is recorded. Another way is to make a subsequent voice instruction requesting processor 124 to reinterpret the original voice instruction. Once the voice instruction has changed to a request for directions and the user approves of the change, the result of directions to the restaurant is recorded with the voice instruction for that episode.

While the preferred embodiment of the invention has been illustrated and described, as noted above, many changes can be made without departing from the spirit and scope of the invention. For example, as noted above, the trigger event or threshold used to determine the output format of presentation content, as well as the specific output format, might vary according to different factors as well as user preference. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for reviewing inputted voice instructions in a vehicle-based telematics control unit, the method comprising: recording voice instructions from a user; performing speech recognition processing of the recorded voice instructions; generating a voice signal based on the performed speech recognition processing; receiving a signal indicating a condition of the vehicle; altering the output of the generated voice signal over an output device in response to the indicated vehicle condition, said altering operable to selectively configure the content of the voice signal; outputting the generated voice signal over the output device; and receiving an instruction from the user to indicate approval or disapproval of the generated voice signal.

2. The method of claim 1, further comprising wirelessly sending at least one of the generated voice signal or the inputted voice instructions to a server over a wireless network upon approval by a user.

3. The method of claim 1, further comprising:
generating a digest including the generated voice signals;
sending the digest to a human operator system; and
connecting the human operator system to the telematics control unit.

4. The method of claim 1, wherein outputting comprises generating and displaying text based on the generated voice signal.

5. The method of claim 1, wherein outputting comprises generating and outputting voice based on the generated voice signal.

6. A system for reviewing inputted voice instructions in a vehicle-based telematics control unit, the system comprising: a user interface for receiving voice instructions from a user; a speech recognition processor coupled to the user interface and operable to perform speech recognition processing of the received voice instructions and to generate a voice signal based on the processed voice instructions; and an output device for outputting the generated voice signal to the user; wherein the user interface is configured to receive from the user an indication of approval or disapproval of the generated voice signal, the user interface to receive a signal indicating a condition of the vehicle and alter the output of the generated voice signal over the output device in response to the indicated vehicle condition, said altering operable to selectively configure the content of the voice signal.

7. The system of claim 6, further comprising a communication component for wirelessly sending the generated voice signal to a server over a wireless network upon approval by the user.

8. The system of claim 6, further comprising:
a first component for generating a digest including the generated voice signal; and
a second component for sending the digest to a human operator system.

9. The system of claim 6, further comprising a text generator for generating text from the generated voice signal, wherein the output device includes a display for presenting the generated text.

10. The system of claim 6, further comprising a voice synthesizer for generating voice based on the generated voice signal, wherein the output device includes at least one speaker for presenting the generated voice.

11. A method for processing of a voice instruction, the method comprising: receiving a voice instruction from a user at a first time; processing the received voice instruction; generating a result based on the processed voice instruction; receiving a signal indicating a condition of the vehicle; altering the output of the generated result over an output device in response to the indicated vehicle condition, said altering operable to selectively configure the content of the result; outputting the generated result to the user; receiving an approval from the user of the generated result; recording the approved result in association with the provided voice instruction; and on receiving the voice instruction from the user at a second time, outputting the recorded result as the generated result.

12. The method of claim 11, wherein approving the generated result comprises correcting the generated result.

13. The method of claim 12, wherein correcting comprises contacting an operator.

14. The method of claim 11, wherein approving the generated result comprises selecting from a list of choices.

* * * * *